Jan. 5, 1965  H. G. ABBEY  3,164,032
BI-DIRECTIONAL DETENT MECHANISM
Filed Dec. 24, 1962  2 Sheets-Sheet 2

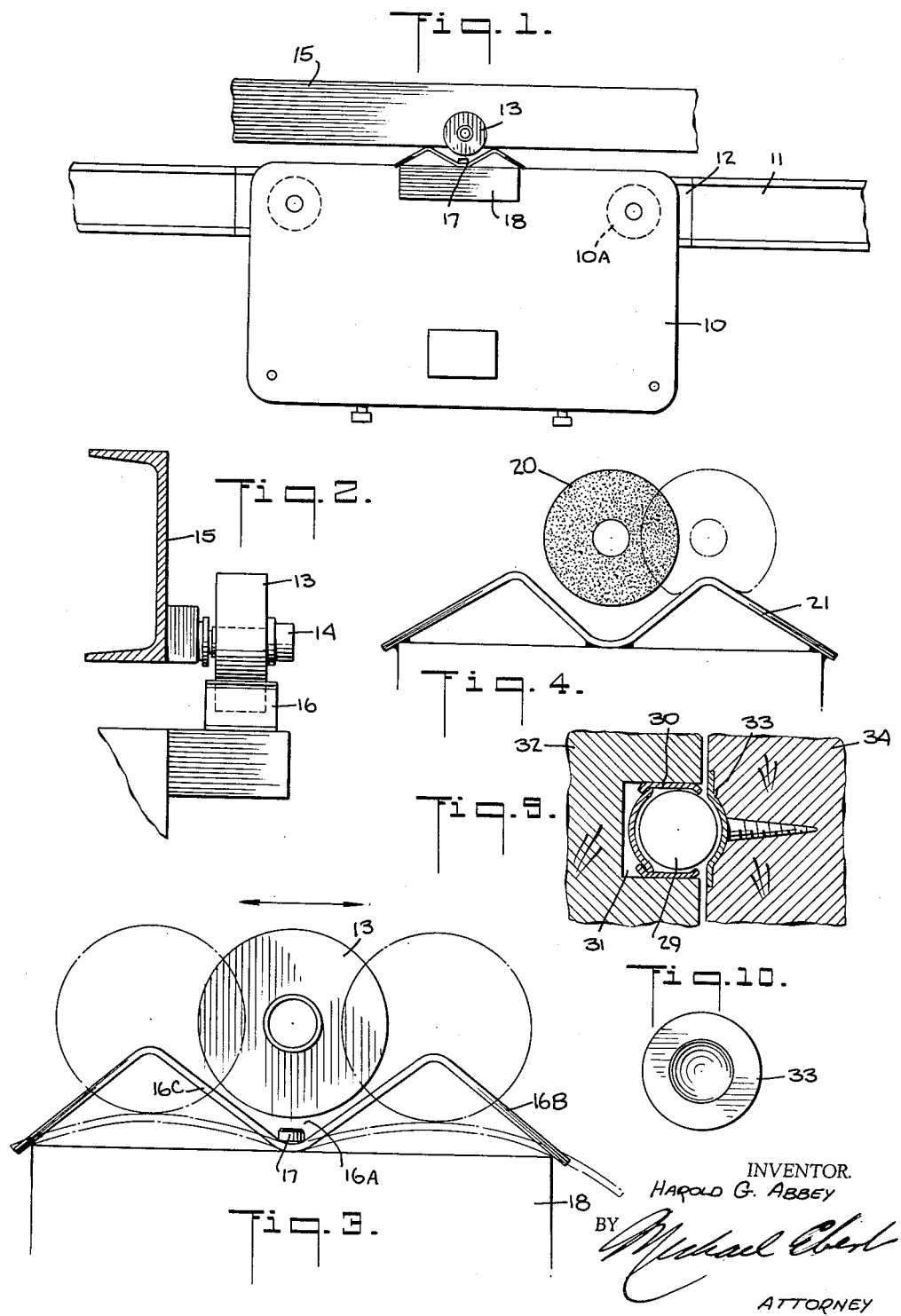

INVENTOR.
HAROLD G. ABBEY
BY Michael Ebert
ATTORNEY

United States Patent Office 3,164,032
Patented Jan. 5, 1965

3,164,032
BI-DIRECTIONAL DETENT MECHANISM
Harold G. Abbey, 189—10 Aberdeen Road,
Jamaica 23, Long Island, N.Y.
Filed Dec. 24, 1962, Ser. No. 246,720
4 Claims. (Cl. 74—527)

This invention relates generally to detent mechanisms, and more particularly to bi-directional detent mechanisms of simple and sturdy construction which operate efficiently to check the displacement of relatively movable parts without regard to the direction of movement.

In conventional detent mechanisms, a spring-biased ball or roller is mounted on one part, the roller being received in a recess plate affixed to the other part, whereby when the roller and recess are aligned, movement is checked. Further movement is effected by applying sufficient force to the movable part to overcome the spring tension on the roller. The common practice is to mount the roller in a fixture which includes a spring acting against the roller in the direction of the recess in the detent plate. Such fixtures must be well designed, otherwise the operation of the detent mechanism is not reliable.

Accordingly, it is the main object of the present invention to provide a detent mechanism of simple and reliable design which functions efficiently.

More specifically, it is an object of this invention to provide a detent mechanism in which the necessary resilience resides in the structure of the detent plate or the coacting roller, without requiring the use of separate spring fixture elements.

A further object of the invention is to provide heavy-duty resilient rollers or tires having outer rings of high strength.

Also an object of the invention is to provide a detent mechanism of the above type having a wide variety of applications and which may be manufactured at very low cost.

For a better understanding of the invention as well as other objects and further features thereof, reference is made to the following detailed description to be read in conjunction with the accompanying drawings, wherein:

FIG. 1 illustrates somewhat schematically in elevational view the detent mechanism in accordance with the invention in conjunction with a trolley movable along a trackway;

FIG. 2 is an end view of the detent mechanism;

FIG. 3 is a diagram illustrating the operation of the detent mechanism in various positions of relative motion of the two parts;

FIG. 4 is a modification of the detent mechanism;

FIG. 9 shows in section another preferred form of detent mechanism according to the invention;

FIG. 10 is a plan view of the fixture for holding the ball in the detent shown in FIG. 9.

Figure 6:
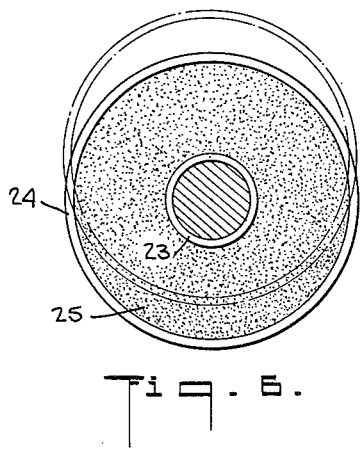
FIG. 6 is a side view of said heavy-duty roller.

Referring to the drawings, and more particularly to FIGS. 1 and 2, there is shown a detent mechanism in accordance with the invention as applied to a trolley 10 which is movable along a trackway 11. The trolley and trackway may be of the type disclosed in my co-pending application Serial No. 221,374, filed September 5, 1962, entitled "Cantilevered Work Carriers for Conveyor Systems." The trolley includes wheels 10A which ride on the flange of the trackway.

In this conveyor system, the trackway includes removable segnments 12 which are operated by elevators (not shown), such that when a trolley enters a segment with a work load, the elevator operatively coupled to the segment acts to lower the segment and the trolley thereon to a work station below the trackway. For this purpose, it is important that the trolley position be held, and a detent mechanism is necessary to check the movement of the trolley when it enters the segment 12.

To this end, the detent mechanism is constituted by a roller 13 which may be of suitable material of high strength, such as steel or hard plastic, the roller being mounted by a shoulder bolt 14 onto a channel member 15 which is fixedly supported in parallel relation to the trackway. The position of the roller is aligned with the midpoint of the removable segment 12 on the trackway so as to maintain the trolley centered thereon.

As best seen in FIG. 3, the roller operates in conjunction with a detent plate constituted by a leaf spring 16 which is formed in a double-humped wave or wing configuration defining a central recess 16A and humps 16B and 16C on either side thereof, the recess being the trough of the wave and the humps the crests thereof. The leaf spring is secured by a single bolt 17 onto a mounting base 18 attached to the trolley, the bolt passing through the trough of the recess whereby the humps are both free to flex.

Thus, as shown in dotted lines in FIG. 3, when the trolley moves in either direction relative to the fixedly-positioned roller, the roller engages whichever hump is approached to depress and somewhat flatten the hump, the roller then entering the recess, at which point the depressed hump is realeased to hold the roller in the recess and check further movement of the trolley. When the trolley is forced to continue its movement in the same direction, the next hump is depressed and the roller rides out of the recess. Obviously the checking characteristics of the detent will be determined by the resilient properties and the wave configuration of the detent plate.

In practice, the roller and detent plate may be reversed, with the roller on the moving part or trolley, and the detent plate on the fixed part.

In lieu of a resilient detent plate of the type shown in FIGS. 1 to 3, the roller itself may be made of flexible material, while the double-humped construction of the detent may be made inflexible. To this end, as shown in FIG. 4, the roller 20 is made of a material such as neoprene, rubber or any other suitable material which may be compressed and deformed. The detent plate 21, on the other hand, while double-humped as in the previous embodiment, has its trough and hump ends welded or otherwise affixied to the mounting plate wherein the configuration thereof is maintained in operation. Alternatively, the detent plate may be made of a solid block having the double-humped contour.

Thus, as shown in FIG. 4 in order for the roller to enter the recess and ride out thereof, it is compressed and deformed as it travels over the humps and assumes its original cylindrical shape when it occupies the recess. The extent of the holding action is, of course, determined by the resilient properties of the roller. In both the FIG. 1 and the FIG. 4 embodiments, the action is bi-directional, and regardless of which way relative movement takes place, the detent action is the same, for the detent plate is symmertically humped with respect to the roller.

Figure 5:
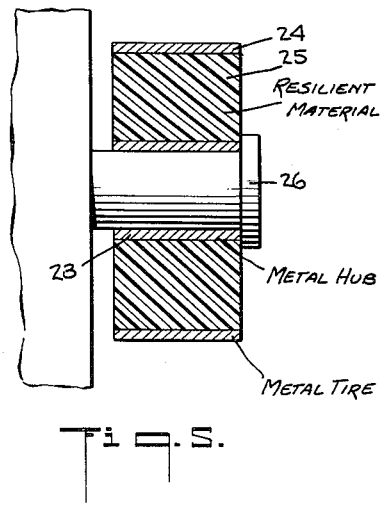
FIG. 5 is a section taken through a heavy-duty resilient roller in accordance with the invention.

For heavy-duty purposes, it is desirable that the surface of the resilient roller element which engages the detent plate, be in the form of a metallic ring of high structural strength. A suitable roller for this purpose is shown in FIGS. 5 and 6, wherein the roller is constituted by an inner cylindrical ring 23, an outer cylindrical ring 24 concentric therewith, and an annulus 25 of resilient material interposed between the rings and bonded thereto. The roller is mounted by means of a bushing 26 received within the inner ring. The two rings are preferably formed of steel, and the annulus of neoprene. As shown in FIG. 6 in dotted lines, when the roller engages a hump of the detent plate, the roller yields, this being effected by compression of the annulus in the area of contact, whereby the outer ring is eccentrically positioned relative to the inner ring.

Figure 8:
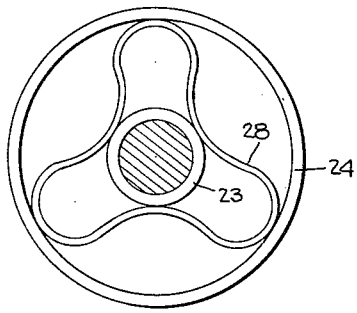
FIG. 8 is still another modification of a heavy-duty roller.
Figure 7:
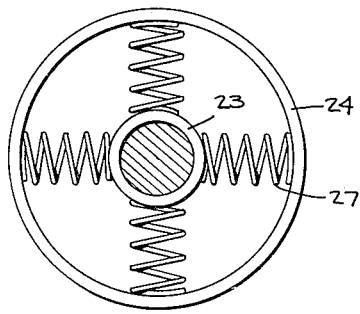
FIG. 7 is a modified form of resilient roller.

In place of a neoprene annulus or other resilient plastic material, the resilient characteristics may be obtained by means of helical springs 27 arranged as radial spokes between the inner and outer rings 23 and 24, as shown in FIG. 7. Alternatively, as shown in FIG. 8, flat springs 28 may be used for the same purpose.

It is also possible to obtain similar results with the use of a resilient ball rather than a roller. In FIGS. 9 and 10, the detent is illustrated in connection with a cabinet-type or door catch, the resilient sphere or ball 29 being freely held within a metal holder 30 mounted within a well 31 cut into one of the parts 32. When aligned, the ball is received within a dimpled detent socket 33 mounted on the part 34. In practice, part 32 may be slidable relatively to part 34, or vice versa. The ball is spherically shaped only when it rests within the detent socket, otherwise it is depressed and deformed. The ball material should be relatively frictionless to permit sliding motion when out of the detent sockets.

Figure 11:
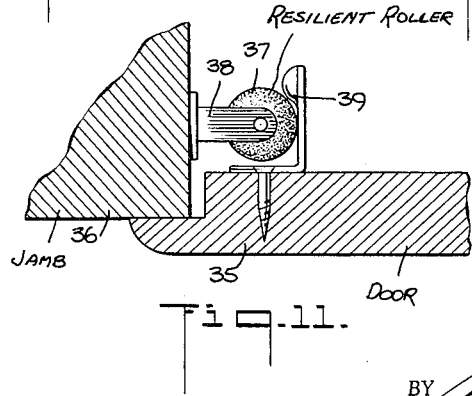
FIG. 11 is a preferred form of detent mechanism for a cabinet.

In FIG. 11, another form of detent mechanism is shown for use in a cabinet having a door 35 and a jamb 36. A resilient roller 37 is mounted by a bracket 38 on the jamb, the roller engaging a stamped detent plate 39 mounted on the door. The plate is deformed to provide interference with the roller, whereby the roller yields to enter a recess in the plate.

While there have been shown preferred embodiments of the bi-directional detent mechanism in accordance with the invention, it will be appreciated that many changes and modifications may be made therein without, however, departing from the essential spirit of the invention as defined in the annexed claims.

What is claimed is:

1. A bi-directional detent mechanism for checking the displacement of a first part movable relative to a second part, comprising a roller element mounted on said first part and formed of concentric inner and outer cylindrical metallic rings and a resilient member interposed between said rings and connected thereto, a shaft extending through said inner ring and attached to the first part to permit rotataion of said roller, whereby when said roller is subjected to pressure said outer ring may be forced to occupy an eccentric position relative to the inner ring, an inflexible detent element fixedly mounted on said second part to engage said roller element at a given relative position of said parts, said detent element having a double-humped configuration to define a central recess which accommodates said roller element, said roller element yielding in either direction of movement to pass over said humps into said recess.

2. A detent mechanism as set forth in claim 1, wherein said resilient member is formed by a neoprene annulus.

3. A detent mechanism as set forth in claim 1, wherein said resilient member is formed of helical spring spokes.

4. A detent mechanism as set forth in claim 1, wherein said resilient member is formed by a symmertical array of leaf springs.

References Cited in the file of this patent

UNITED STATES PATENTS

| | | |
|---|---|---|
| 1,756,270 | Whittenberger | Apr. 29, 1930 |
| 2,048,937 | Larson | July 28, 1936 |
| 2,236,026 | Westcamp | Mar. 25, 1941 |
| 2,450,410 | Baymiller | Oct. 5, 1948 |
| 2,615,316 | Kirwin | Oct. 28, 1952 |
| 2,846,254 | Forest | Aug. 5, 1958 |
| 3,024,740 | Peras | Mar. 13, 1962 |

FOREIGN PATENTS

| | | |
|---|---|---|
| 796,113 | Great Britain | June 4, 1958 |